United States Patent

Bunker et al.

[11] 3,982,226
[45] Sept. 21, 1976

[54] MEANS AND METHOD FOR ERROR DETECTION AND CORRECTION OF DIGITAL DATA

[75] Inventors: William H. Bunker; Juan A. Rodriguez, both of Boulder, Colo.

[73] Assignee: Storage Technology Corporation, Louisville, Colo.

[22] Filed: Apr. 3, 1975

[21] Appl. No.: 564,741

[52] U.S. Cl. .................................. 340/146.1 AL
[51] Int. Cl.[2] ........................................ G06F 11/12
[58] Field of Search ............... 340/146.1 AL, 172.5

[56] References Cited
UNITED STATES PATENTS

| | | | |
|---|---|---|---|
| 3,675,200 | 7/1972 | Bossen et al. | 340/146.1 AL |
| 3,697,948 | 10/1972 | Bossen | 340/146.1 AL |
| 3,745,526 | 7/1973 | Hong et al. | 340/146.1 AL |
| 3,745,528 | 7/1973 | Patel | 340/146.1 AL |
| 3,800,281 | 3/1974 | Devore et al. | 340/146.1 AL |
| 3,851,306 | 11/1974 | Patel | 340/146.1 AL |
| 3,868,632 | 2/1975 | Hong et al. | 340/146.1 AL |

*Primary Examiner*—Charles E. Atkinson
*Attorney, Agent, or Firm*—Woodcock Washburn Kurtz & Mackiewicz

[57] ABSTRACT

Apparatus for detecting and correcting errors in one or two tracks of a multi-bit, multi-track data group which includes an error correction character (ECC). The received data group is simultaneously stored and applied to an ECC generator which operates upon each data byte according to an operator B such that an error correction character ECC is reproduced. The ECC is of such a nature that another application of operator B produces a new character termed an error vector E. If all of the received data characters are correct all data bits of the error vector E will be zero. The error vector may be regressively operated on by the operator B and sequentially compared to a locally-generated parity vector $P_n$. If single track is in error its identity is determined by the number of cycles by operator B necessary to obtain an error vector identical to the parity vector. If more than one track is in error, and identified by means of pointers, the tracks and the difference therebetween are identified and a divisor generated to operate on the previously-obtained combination of error and parity vectors. The resulting dividend comprises an error vector for a least significant track, and is applied through a correction matrix to correct that track. The least significant track error vector is also combined with locally-generated parity to produce an error correction vector for the most significant track, which is applied to a correction matrix to invert erroneous bits of data in the relevant track of uncorrected information received from the storage register.

12 Claims, 14 Drawing Figures

Fig. 1a

| ELEMENT | | FIGURE |
|---|---|---|
| RECEIVED DATA STORAGE REGISTER | 2 | 2 |
| ECC GENERATOR | 3 | 3 |
| TRACK SEQUENCE INVERTER | 4 | 2 |
| ECPG | 5 | 5 |
| LOCAL PARITY GENERATOR | 6 | 2 |
| VECTOR COMBINING MATRIX | 7 | 5 |
| VECTOR STORAGE REGISTER | 8 | 5 |
| COUNTER | 9 | 4 |
| DATA CORRECTION MATRIX | 11 | 9 |
| TRACK SEPARATION LOGIC | 12 | 6 |
| LST AND SEPARATION IDENTIFICATION LOGIC | 13 | 13 |
| COUNTER | 14 | 11 |
| DIVISOR GENERATOR | 15 | 12 |
| DIVIDEND LOGIC | 16 | 12 |
| LST CORRECTION VECTOR MATRIX | 17 | 7 |
| XOR GATE | 18 | 12 |
| MST CORRECTION VECTOR MATRIX | 19 | 8 |
| PARITY CORRECTION LOGIC | | 10 |

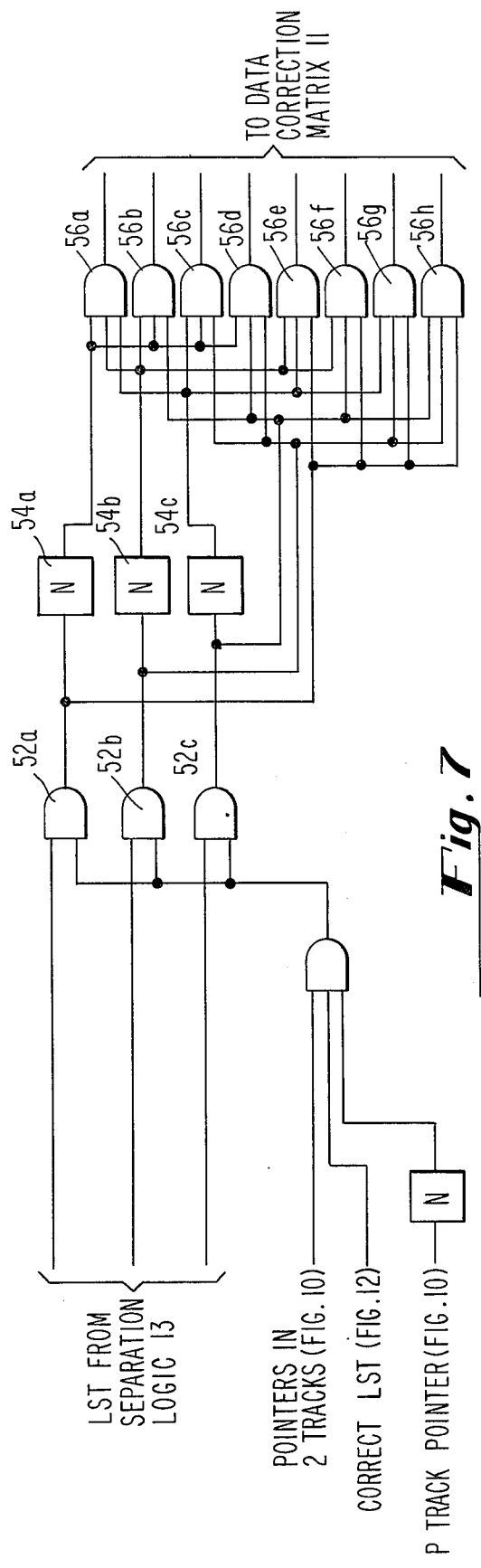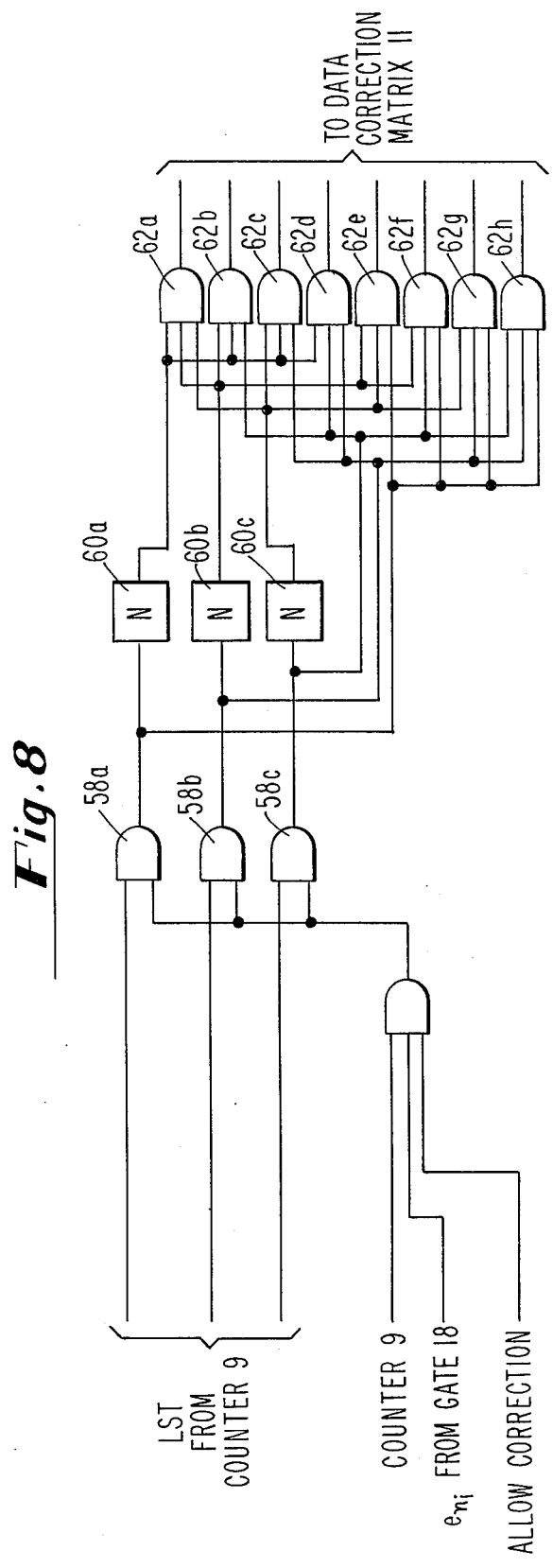

MEANS AND METHOD FOR ERROR DETECTION AND CORRECTION OF DIGITAL DATA

BACKGROUND OF THE INVENTION

The present invention relates to digital data processing, and more particularly to an improved means and method for detecting and correcting errors in a single track of data, and correcting errors in two identified erroneous data tracks.

In transporting and processing data coded into digital form, immense numbers of individual data bits must be processed at a high rate. Since each data bit uniquely contributes to the meaning of the encoded data, the erroneous detection and/or processing of even a single bit of data can result in significant errors. However, in view of the enormous number of individual bits which are to be processed, a failure with respect to one or more bits among a large number thereof is a statistical probability.

In order to insure against certain types of failures, various types of correction mechanisms have been designed. One approach is to provide redundant data processing mechanisms, and compare the outputs thereof. The disadvantages to this approach are manifest in that it requires the expensive duplication of systems. Other approaches have involved the use of error-checking codes which themselves can be so complex as to require an inordinate amount of digital data for their implementation.

Recently there has been proposed a recorded format for group coded recording 6250 bits per inch. The format of this standard requires a data group of seven data characters plus an error-checking code character, there being seven data characters. Each data character comprises one byte of eight bits, plus a parity bit. One track is provided for each bit, there being a total of nine tracks. The ECC character is formed from a seventh-order polynomial, the coefficients for each term of which comprise one of the data characters so that each data character D1–D7 is a coefficient for one of the polynomial terms. By associating the coefficients in increasing order with the polynomial terms which are arranged in decreasing order, and multiplying the sum thereof by a generator polynomial the ECC character can be created. However, while the mathematical relationship between the ECC character and the information encoded in the data bytes is known, the method of making use of the ECC character, and the means therefor, are not publicly known.

It is therefore an object of the present invention to provide a means and method for the correction of data arranged in a format according to the 6250 CPI group-coded recording proposed national standard.

It is another object of the present invention to provide improved means for making use of the error-checking code of the 6250 CPI group-coded recording proposed standard.

Still another object of the invention is to provide a means and method for detecting and correcting errors in one track of a multi-track data group using an ECC, and for correcting two erroneous tracks in such a data group in the presence of pointer values identifying the erroneous tracks.

SUMMARY OF THE INVENTION

Briefly stated, in accordance with one aspect of the invention the foregoing objects are achieved by providing means for operating upon received data characters in byte-by-byte fashion to generate an ECC character in accordance with a known polynomial. Finally a received ECC character is operated upon, the result thereof being termed an error vector. This vector is then regressively operated upon by the same operator B, the result of each $i$th operation comprising an error vector $e_{ni}$ which is compared on a bit-by-bit basis with a locally generated even parity vector $P_n$. A match between the two vectors indicates the presence of error. In the absence of a two track pointers, the error is known to be in the $i$th track and the error vector $e_{ni}$ is applied through a correction matrix for correcting the faulty track. If two track pointers are in existence vector $e_n$ is operated on $i$ times, $i$ being equal to the most significant track. The summed error and parity vectors are then divided by a term which is identified by the separation between faulty tracks, and error vectors $e_{ni}$ (for the most significant track) and $e_{nj}$ (for the least significant track) generated and applied to a data correction matrix for correcting the faulty tracks $i$ and $j$.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings which:

FIG. 1a is a table associating the elements of FIG. 1 with subsequent Figures; and FIGS. 2–13 are schematic diagrams of the specific logical elements and the interconnection therebetween used to form the system of FIG. 1.

DESCRIPTION OF A PREFERRED EMBODIMENT

Figure 1:
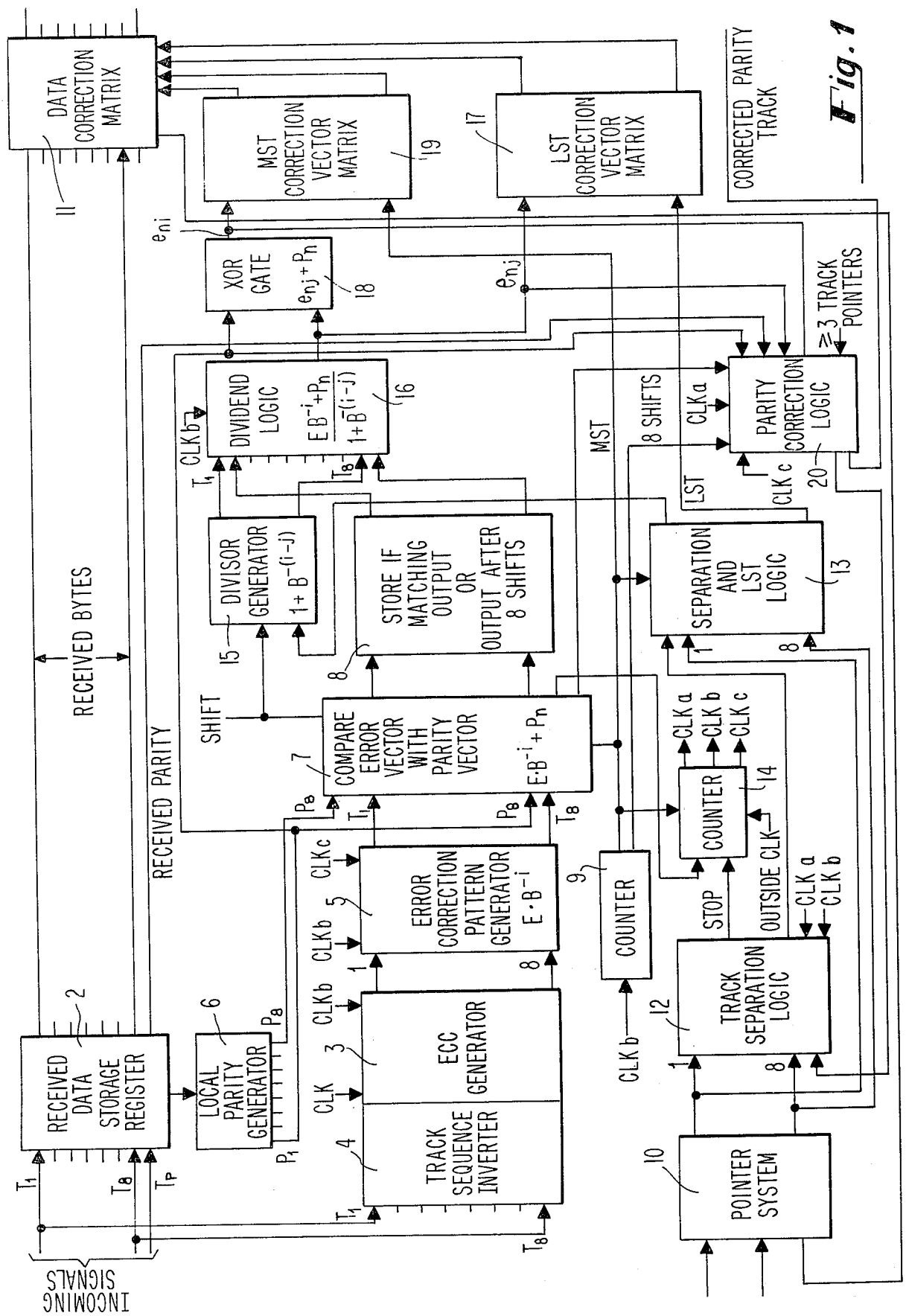
FIG. 1 is a functional schematic diagram of an entire detection and correction system according to the teachings of the present invention.

In FIG. 1 there is shown one embodiment of a system for detecting and correcting errors in digital information according to the teachings of the present invention. Digital signals or bits are derived from a source such as a moving magnetic tape or a disk, and processed by conventional input stages which commonly include an analog-to-digital converter, and a stage to deskew the data and detect the format thereof. After this initial processing, which is referred to by way of background and is not germane to the operation of the present invention, the incoming signals are applied bit-by-bit to a received data storage register 2 and to an error correction character (ECC) generator 3. A track sequence inverter 4 may advantageously be coupled between the source of incoming signals and the ECC generator 3 for purposes which will become evident.

It is contemplated by the present invention that the incoming data will conform to a standard such as the 6250 BPI group coded recording standard proposed for recorded magnetic tape for information interchange by ANSI and designated X3B1–665. The standard is intended to provide a format and recording standard for ½ inch, nine track magnetic tape, communications systems and associated equipment using the USA standard code for information interchange designated X3.4–1968 and including the amendments thereto. The instant format relates to group coded recording for 6250 bits per inch and envisions a data group which includes seven data characters plus an ECC character.

Each data character comprises a byte of eight bits, one each upon eight of nine parallel tape tracks. The ninth track contains a parity bit for each byte including the ECC byte.

As set forth in the above-referenced standard, the ECC character is directly related to the content of the data group in the following manner. If each of the data characters $D_1$ through $D_7$ are considered to be the coefficients of polynomial terms $D_1$ through $D_7$ respectively, a polynominal may be generated in the following form:

$$X^7D_1 + X^6D_2 + X^5D_3 + X^4D_4 + X^3D_5 + X^2D_6 + X^1D_7 \qquad (1)$$

The polynominal character ECC is computed from data polynomial coefficients $D_1$ through $D_7$ using a generator polynominal G, where G equals $$X^0 + X^3 + X^4 + X^5 + X^8 \qquad (2)$$

such that the resulting expression may be written as $$ECC = [X^7D_1 + X^6D_2 + X^5D_3 + X^4D_4 + X^2D_5 + X^2D_6 + X^1D_7] G \qquad (3)$$

As will be hereinafter set forth, given the abovementioned mathematical realtionships an appropriate logical format may be selected to accomplish the generation of the ECC term. Further, for purposes of ease in explanation it should be pointed out that the track numbers of a polynominal coeffficient for any term in the ECC character do not necessarily correspond with the exponential power of the polynominal term. In one suggested implementation the following relationship obtains:

| Polynomial Term | Track Number |
| --- | --- |
| $X^1$ | 5 |
| $X^4$ | 7 |
| $X^7$ | 3 |
| $X^3$ | 2 |
| $X^6$ | 1 |
| $X^0$ | 0 |
| $X^2$ | 6 |
| $X^5$ | 4 |

For purposes of explanation, the track term under examination which is associated with the lowest coefficient polynomial term will be termed the "most significant" track or MST. Where two tracks are to be differentiated from the rest, the track number associated with the polynomial term having the higher coefficient will be designated the least significant track or LST.

Returning to FIG. 1, it will now be understood that as the eight bits of any byte $D_n$ are simultaneously passed to ECC generator 3 on tracks $t_1$–$t_8$, the generator computes an ECC representing the cumulative effect of all bytes $D_1$–$D_n$ processed at that time. Thus, after seven bytes have been processed the output of ECC generator 3 should in fact be the error correction code byte itself. It can be shown that one more such operation, conducted upon an ECC character which is generated by correct data characters, will give a byte E all of whose bits are identically zero. Thus, the error term E in fact serves as a check to assure that all of the bits of the received characters are correct.

The output of generator 3 is then passed to an error correction pattern generator (ECPG)5. The operation of the ECPG is in essence the inverse of that of the ECC generator 3 such that if the ECC generator is conceived of as implementing the operation of operator B once upon each received byte of information, the ECPG 5 may be conceived of as operating $B^{-i}$ times upon an applied output E of the ECC generator and can thus be represented as $$EB^{-i} \qquad (4)$$

The ninth or parity track P is also applied to data storage register 2 and, at the same time, to a local even parity generator 6. Thus, parity generator 6 produces a series of bits, one for each of the applied bytes, which bits produce even parity for each of the bytes and its associated original (odd) parity bit. The parity bits for each track 1–8 are applied to the inputs of vector combining matrix 7 along with, and in inverse order to, the individual bits of an eight-bit character outputted by ECPG 5. Thus, the eighth bit of the generated parity is combined with the first bit of the ECPG character, the seventh parity bit with the second ECPG character, etc. The ECPG output, designated $EB^{-i}$, is thus added term by term with the locally generated parity $P_n$ and the term-by-term combination thereof passed to a vector storage register 8. Register 8 may be an ordinary logic array capable of retaining one serially-applied byte of eight bits each. In this manner eight ECPG outputs may be sequentially compared, term by term, with locally generated parity $P_n$ and the results stored in register 8.

A suitable source of SHIFT signals (not shown) may be provided. The shifting signals are applied to ECPG 5 at appropriate times for causing the generator to operate upon bytes applied thereto by ECC generator 3. The signals are also applied to a counter 9, the output of which is applied both to the comparison stage 7 and to further circuitry to be described hereinafter. It is also noted that combining matrix 7 includes suitable logic to produce a STOP SHIFT signal when all eight ECPG outputs have been sequentially compared with locally generated parity $P_n$; or when the addition of one of the error vectors and the parity term produces a byte of all logical zeros. The STOP SHIFT signal is then applied to the mechanism which produces the SHIFT signal, so that the shifting of the ECPG 5 ceases.

As is relatively common in present-day digital equipment, a pointer system 10 is provided for receiving pointers from appropriate areas within the system. As will be recognized by those skilled in the art, a "pointer" is merely a signal which designates the occurrence of a particular type of error or failure. The error or failure may be of either electrical or mechanical nature and may relate, for instance, to the failure of the read transducers to properly sense recorded data bits, an out of phase condition of bits in one or more tracks, or any number of other conditions which the equipment designer feels should be recognized by an error detection system. One input to the pointer system is derived from the data correction matrix 11 which comprises the final stage of the error correction and detection system shown. Other pointers may be derived from initial processing circuitry, analog-to-digital converters, deskew circuitry, etc. In a preferred embodiment, all pointers are such as to identify the particular track or tracks upon the tape with which the failure is associated. Thus the pointer system may comprise a simple decoding matrix which steers applied signals to a proper output, which corresponds to the track or tracks sensed to be in error. In the disclosed embodiment, track separation logic 12 is provided with eight input lines, one representing each data track, and has the pointer system 10 coupled thereto to energize the input or inputs of separation logic 12 which correspond to the track or tracks detected to be in error. In like manner the eight output leads of the pointer system 10 are also coupled to corresponding input terminals of a track separation and least significant track (LST) module 13. Other information supplied to the LST and separation module 13 include the track separation derived by logic 12 and the output of binary counter 9, which reflects the number of shifts or operations by ECPG 5 which have occurred in the processing of a given data character.

When the track separation logic 12 has achieved a state in which track separation may be calculated, a signal is applied to counter 14 which terminates the operation of the counter. The output of the counter has in the meantime been applied to a divisor generator 15 in order to sequentially gate the output of a read only memory therein into dividend logic 16. The combined inputs to the track separation and LST logic 13 cause the later stage to produce a signal indicative of the number of tracks separating two tracks found (by means of pointers) to be in error. The difference between tracks, which may be represented as $i-j$, is applied to the divisor generator 15 in order to identify that term within the memory which is to be selected for application to dividend logic 16. At the same time, data indicating the identity of the least significant track $j$ is applied to an LST correction vector matrix 17.

As will be hereinafter explained, the signal outputted by dividend logic 16 serves to identify an error vector associated with the least significant erroneous track $j$. This signal is applied to LST correction vector matrix 17, and to adding logic 18 wherein it is additively combined in a term-by-term fashion with the locally generated parity $P_n$. The result of this combination is an error vector $e_{ni}$ for the most significant track, and is applied to the MST error correction vector matrix 19 along with the output of counter 9 which indicates the identity of the most significant track. A correction term of eight bits is applied at once, by means of eight parallel leads, to appropriate input terminals of data correction matrix 11 from either or both MST or LST correction vector matrixes 19 and 17, respectively. As will be seen from a brief inspection of FIG. 1, the correction matrix 11 receives all bits of each data byte $D_n$, one byte at a time. The bytes are stored within the correction error logic in a suitable register and combined with the outputs of logic stages 17 and 19 to correct the erroneous tracks. The corrected tracks are then gated out of the data correction matrix 11 on eight parallel leads, so as to again form sequential data bytes, and passed to conventional utilization circuitry (not shown).

A parity track correction logic stage 20 is provided with inputs from the error and parity vector combining matrix 7, inputs representing the actual received parity from data storage register 2, generated even parity from generator 6, a signal representing the least significant and most significant data tracks and error, in a signal derived from pointer signals and indicating the presence of errors in three or more tracks. An output of the parity track correction stage 20 is then applied to the track separation determining logic 12, the other output comprising the corrected parity track.

The basis of operation for the system elements enumerated in FIG. 1 will now be set forth. As indicated, the error correction code character is computed from data polynomials $D_1$–$D_7$ using generator polynomial G in accordance with expression (2) above. Further, a locally generated parity signal $p_n$ is produced and reflects the characteristics of both the received data signals and the parity bits associated with each data byte. An error vector E is generated by operating upon the received data and ECC characters in byte-by-byte fashion, the next-to-last byte comprising the ECC character. If there are no errors in the data characters the resultant error vector E will be zero.

If there is an error in one track $i$, which occurs in any data byte $D_n$, the error vector $e_{ni}$ may be equated to the basic error term E regressed by the operator B a number of times $i$ which is equal to the track position, or $$e_{ni} = EB^{-i} \qquad (5)$$

Further, for the one-track error case, the error vector $e_{ni}$ will be equal to the locally generated even parity track or $$e_{ni} = p_n \qquad (6)$$

For any two information tracks $i$ and $j$ which contain errors, $i$ being identified as the track positioned closest to the lowest order polynomial term (most significant track) and $j$ being the track furthest therefrom (least significant track), then $$e_{ni}B^i + e_{nj}B^j = E \qquad (7)$$

and $$e_{ni} + e_{nj} = p_n \qquad (8)$$

The former equation may be multiplied by a common factor $B^{-i}$ to produce $$e_{ni} + e_{nj}B^{-(i-j)} = EB^{-i} \qquad (9)$$

which can be solved for the least significant track (LST) in error to yield $$e_{nj} = \frac{EB^{-i} + P_n}{1 + B^{-(i-j)}} \qquad (10)$$

from preceding equation (8) the most significant track (MST) in error can then be derived from the relationship $$e_{ni} = P_n + e_{nj} \qquad (11)$$

From the foregoing general case the case for a single, unknown track in error can easily be derived, since the term $e_{nj}$ will be equal to zero. In this case the error vector for the $i$th track $e_{ni}$ will be equal to $EB^{-i}$. With respect to the apparatus of FIG. 1 the latter term corresponds to an output of the error correction pattern generator 5 which in fact is the term E which has been regressed or "shifted" by the operator B a total of $i$ times. When combined with the parity vector $p_n$, as by means of the vector combining matrix 7, the term-by-term result will be zero. This result indicates the presence of a single track error in which case the need to determine track separation ceases so that the track separation logic 12 will be inoperative, as will other track separation and least significant track determining apparatus. The identity of track $i$ will be understood to be that number of regressions or shifts undergone by the error correction pattern generator 5, and therefore equal to the number of SHIFT signals which have been applied to the ECPG in order to yield that error vector $e_{ni}$ which, when combined with the locally-generated parity $P_n$ produces a zero. The number of shifts is totaled by counter 9. This information, which identifies the only, and therefore most significant, error track is supplied to MST correction matrix 19 to ultimately effect the correction of the improper track in data correction matrix 11.

If the residual value of the ECPG is zero, but the output of the local parity generator 6 is not zero the mismatch indicates a track in error. As the zero output of the ECPG indicates that no errors are present in the various data tracks, the single track in error must then be the parity or P track. In this event a pointer is generated to indicate the presence of an error in track P, and improper bits in the parity track are inverted in the received data correction matrix 11.

Figure 6:
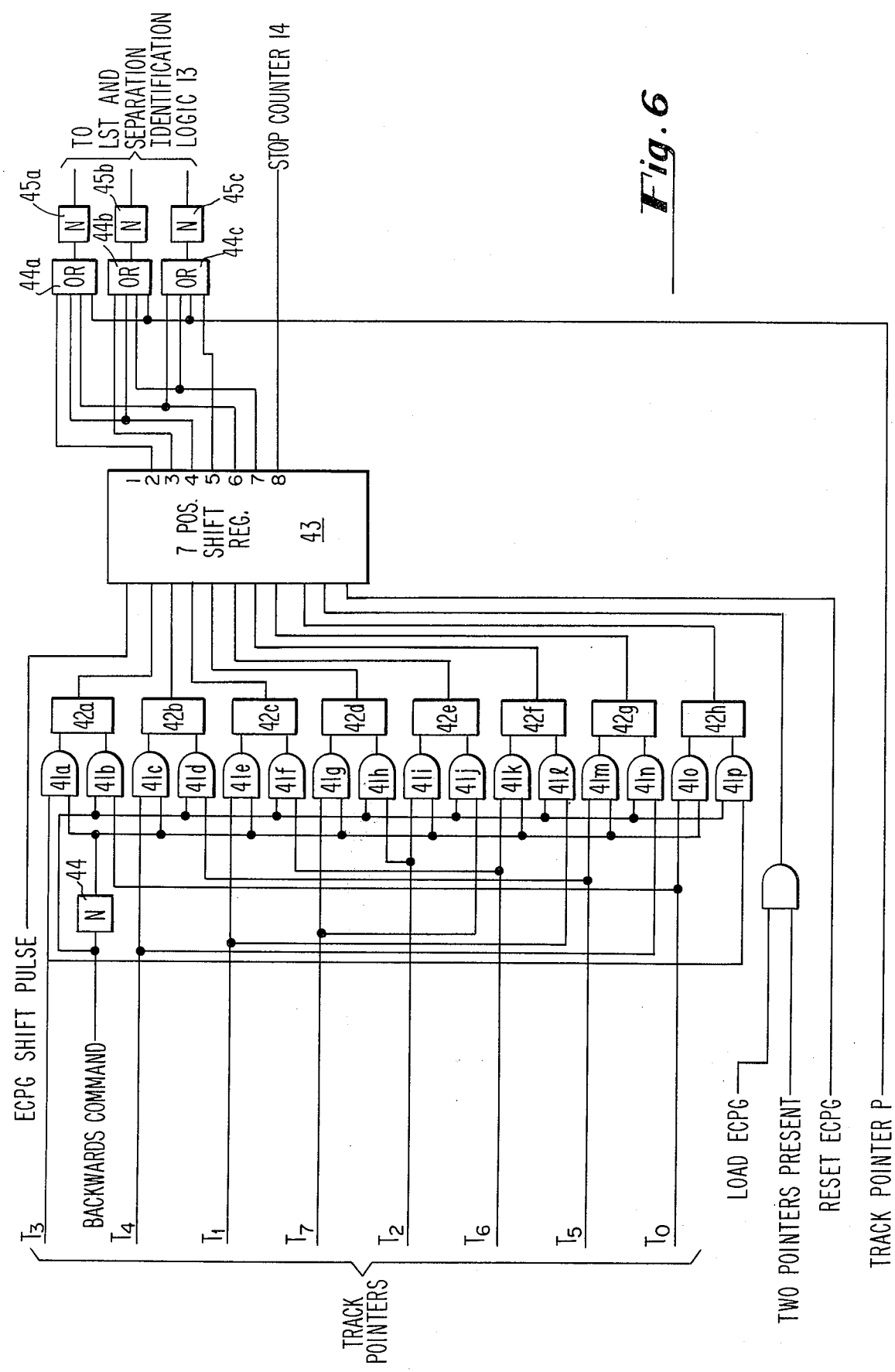

In another case, it will be assumed that pointers external to the instant correction system have identified the fact that two tracks are in error, and identified the separation or difference between the track numbers. As will be recalled, pointers indicating the faulty tracks are applied to the various input terminals of track separation logic 12, shown in detail in FIG. 6. The signals indicating the existance of pointers for the various tracks are sequentially shifted through a seven position shift register by the ECPG shift pulse in increasing order, according to the exponents of the polynomial terms with which they are associated. The first track pointer arising in the last (bottom) register output 7 will then correspond to the most significant track (MST). At this point, a STOP signal is outputted by the register to counter 14. Counter 14 is also effecting a cyclic shifting of the various signal processing stages including ECPG 5 and vector combining matrix 7, and also ECC generator 3 but ceases this activity in response to the STOP signal. The value of counter 48 (FIG. 15) is then inputted to the read only memory of divisor generator 15. Referring to FIG. 6, by comparing the locations of pointer signals in the shift register of track separation logic 12 and deriving th difference therebetween the track separation, which may be expressed as $(i-j)$, is applied through appropriate encoding in stage 13 whose output is coupled to the read only memory of divisor generator 15.

The read only memory is triggered to output appropriate values of the expression $$1 + B^{-(i-j)} \tag{12}$$

for all possible values of $(i-j)$, which in the instant case corresponds to seven characters. The proper one of these terms is selected according to the value of $(i-j)$ which has been received from stage 13 and applied to dividend logic 16 in accordance with equation (10) to produce the proper error vector $e_{nj}$ for correcting errors in the $j$th track of the data characters. Error vector $e_{nj}$ is then applied to LST correction matrix 17 which selects the most significant track in error and supplies the information at the proper time to data correction matrix 11.

The error vector $e_{ni}$ which is to be used for correcting the most significant faulty track $i$ is derived by XOR gate 18 and applied to the MST correction matrix 19, along with a term denominating the most significant track $i$ received from counter 9. The output is then also applied to data correction matrix 11 wherein the most significant faulty track is corrected.

Another case of interest is that in which two tracks are in error, one of the tracks being the parity track P. In this case the LST vector $e_{nj}$ will be equal to zero. As in the case of a single data track error, the error vector for the most significant track $e_{ni}$ will be equal to the basic error term E shifted (regressed) a number of times equal to the track position $i$ or $$e_{ni} = EB^{-i} \tag{5}$$

In addition, the relationship $$P_n = e_{ni}$$

continues to hold true, it being recalled that the parity vector $p_n$ is generated locally and reflects erroneous terms in all tracks including the parity track P. The occurrence of this special case may be ascertained when the pointer system indicates the presence of errors in two tracks yet only one pointer signal is present in the shift register of logic 12, that is, the calculated separation $(i-j)$ is equal to zero. This indicates that only one data track is in error and therefore that the second erroneous track must be the parity track P.

Parity correction logic 20 receives both the parity vector P from received data storage register 2, the locally generated parity from generator 6, and the error vector $e_{ni}$ which is produced by XOR gate 18. It will now be seen that this information is adequate to not only identify the presence of an error in the parity track P, but as a consequence of knowing the error in data track $i$ the actual parity for the corrected data can be deduced.

With the aid of the foregoing description it is believed that the system of FIG. 1 may be easily implemented through the use of standard easily-available logical elements, using known techniques to achieve the requisite combining, shifting and storage of terms, and such other data processing as has been indicated hereinabove. It will therefore be understood that various approaches may be taken to achieve the functional equivalent of the system set forth in FIG. 1. Therefore, while the additional FIGS. 2-13 set forth in detail the specific elements utilized in one successfully tested embodiment of the invention, it is understood that the invention is not considered limited to the specific execution set forth.

Figure 2:
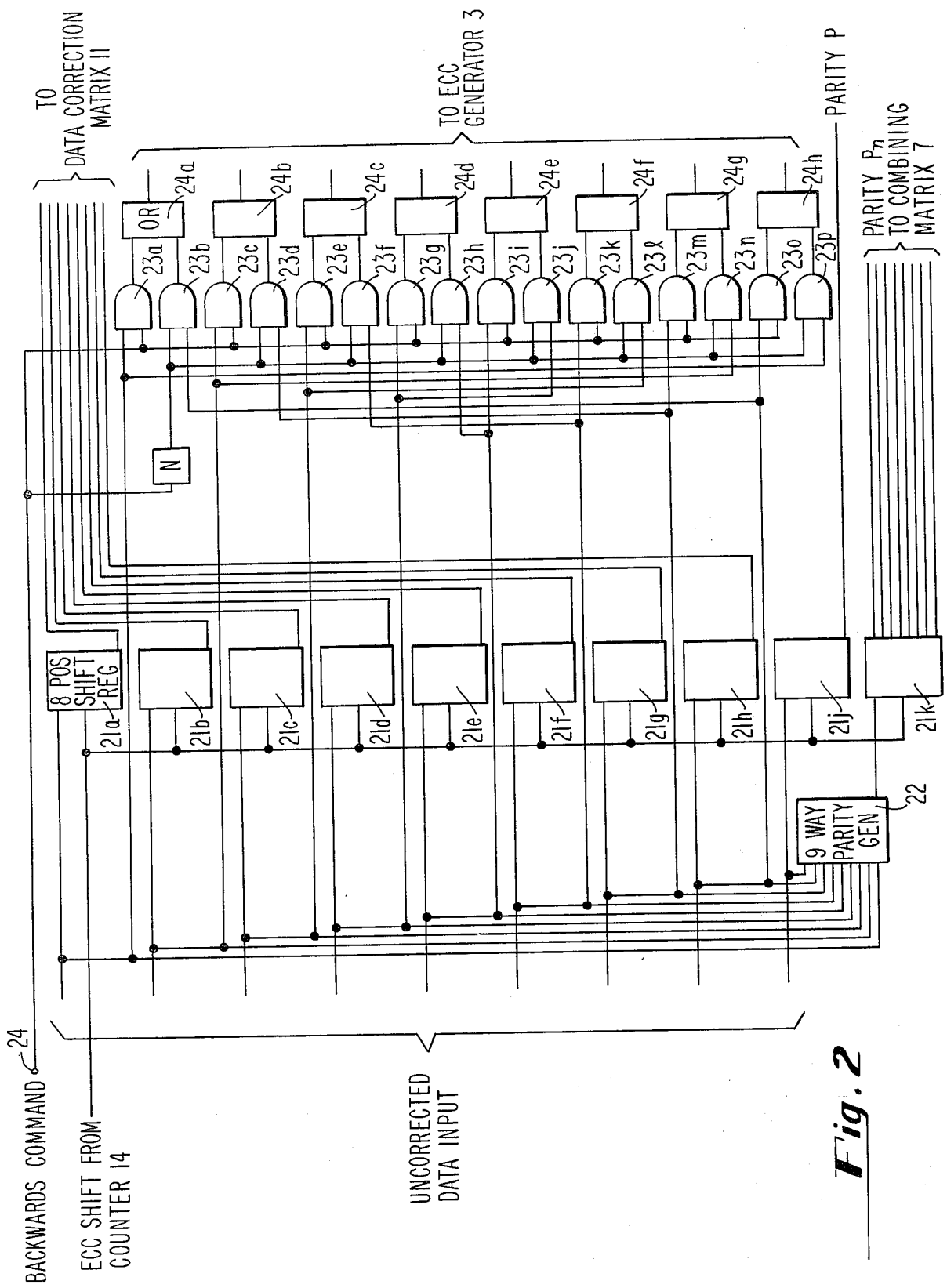

Referring now to FIG. 2, there is shown a data storage register which is comprised of eight 8-position shift registers designated 21a-21h. Each of the shift registers 21a-21h is coupled to a suitable input which receives data from a predetermined data track. Each of the eight positions of each shift register correspond to a particular data byte $D_1-D_8$ such that bits of eight data bytes may be sequentially stored in the appropriate shift registers. In addition, two more 8-position shift registers $21j$ and $21k$ are associated with a track for received parity data P, and locally generated even parity $p_n$, respectively. A nine-way parity generator 22 receives inputs from eight data tracks and the parity track P and produces an even parity bit for each data byte, which is stored in 8-position shift register $21_k$. The bits of the locally generated parity vector $p_n$ then appear on the eight outputs of register $21_k$.

The signals outputted by shift registers 21a–21h are passed to sequencing logic generally indicated at 23. Logic 23 comprises a bank of AND gates 23a–p, pairs of which are coupled to two-input OR gates 24a–h in the manner shown. An enabling signal applied to terminal 24 serves to enable odd ones of the AND gates 23a–p in order to reverse the sequence in which applied track signals appear on the output leads of the logic bank. This capability is necessary if it is desired to operate the track-bearing element, for instance a magnetic tape, in a reverse direction. It will be recalled that the tracks are not numbered in ascending order, but are mixed in such a fashion that upon reversal a signal which might for instance might have been on a "1" track will then appear on a "5" track location, etc. In order to then associate the incoming signals with the proper track identities, the AND logic 23a–p is necessary. Of course, should the data-bearing medium not be operated in the reverse direction, the AND logic bank 23 may be dispensed with.

Figure 3:
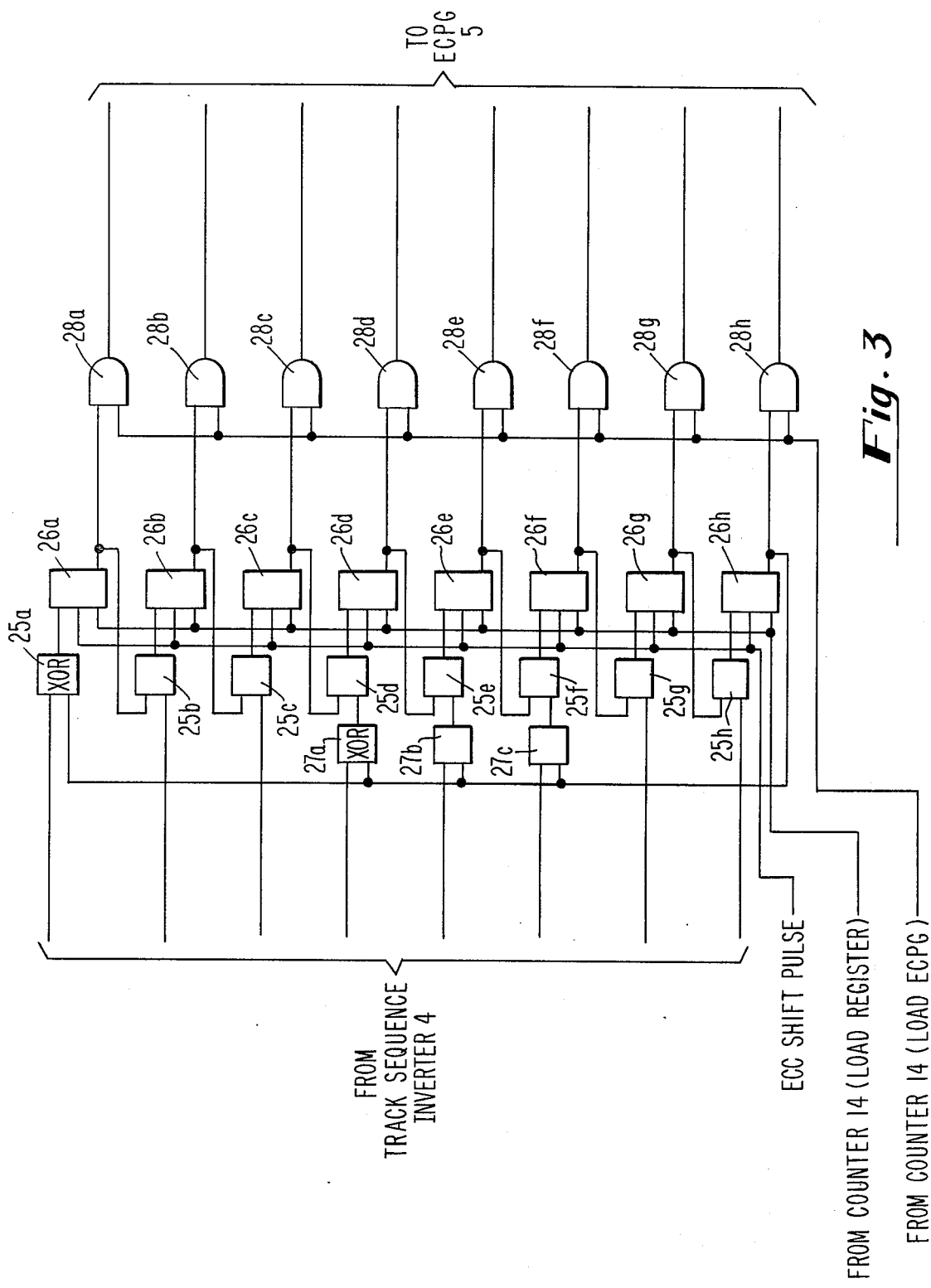

The uncorrected data received from shift registers 21a–21h, reoriented by logic bank 23 if necessary, is then applied to an error correction code generator 3, represented in detail at FIG. 3. The ECC generator takes the form of a plurality of exclusive OR gates 25a–h coupled together in the manner shown and having the outputs thereof coupled to flip-flops 26a–26h. It will be noted that the output of flip-flop 26h is fed back to the input of exclusive OR gate 25a and to gates 25d–25f through additional exclusive OR gates 27a–27c. The operation of the illustrated logical elements is easily mapped and can be shown to produce the effect of the operator B or, equivalently, to operate upon serially applied data bytes in a byte-by-byte fashion in accordance with the polynomial expression shown above at (3). Finally, AND gates 28a–28h each have one input thereof coupled to the output of the corresponding flip-flops 26a–26h, the other inputs thereof being coupled to a common point for receiving an enabling signal from counter 14 which allows the flip-flop outputs to be loaded into the error correction pattern generator 5 at a predetermined time.

Figure 4:
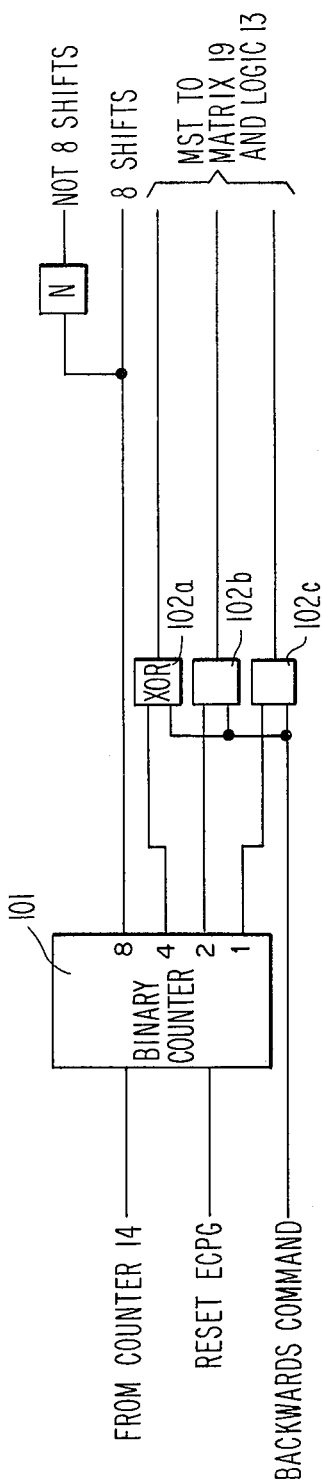

FIG. 4 illustrates the logical elements making up counter 9. A four-output binary counter 101 receives clocking and reset signals from counter 14 and divisor generator 15, respectively. In addition a backwards command is made use of, the latter signal being derived from appropriate reversing apparatus in the tape transport system. As the manner in which such external signals are produced plays no part in the operation of the present system and is familiar to workers in the art the apparatus which produces the signals will not be discussed herein.

The 8th position output of binary counter 101 is brought out of counter 9 along with the complement thereof to comprise a pair of signals which signify whether eight shifts of the ECPG 5 have occurred. The 1, 2 and 4 outputs of the counter 101 are brought out for indicating the identity of the most significant track (MST) in which errors have been perceived. The MST signal is passed through XOR gates 102a–c, the other inputs of which are adapted to receive a backwards command signal. In this manner the sequence of track numbering is inverted during periods of reverse operation of the data-bearing element.

Figure 5:
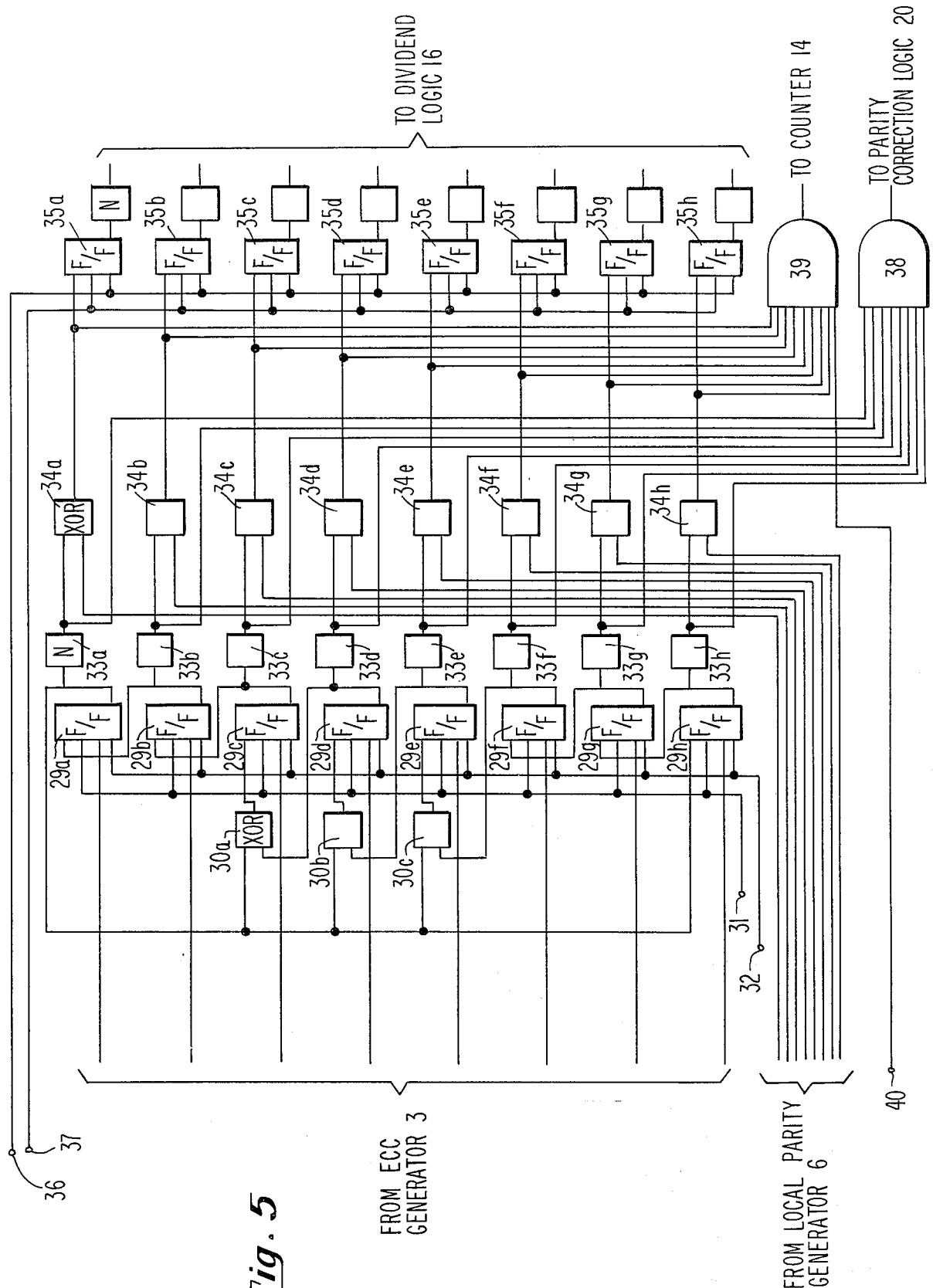

FIG. 5 shows the logic which comprises the ECPG and serves to implement the operator B in accordance with the polynomial expression (3) above. A series of eight JK flip-flops 29a–29h are coupled one to the other to form a ring. The output of flip-flop 29h is coupled to that of 29a and to the inputs of flip-flops 29c–29e by means of exclusive OR gates 30a–30c.

The eight bits outputted from ECC generator 3 are applied to lines 1–8, and therefore the input terminals of flip-flops 29a–29h. As each byte of information arises the individual bits thereof condition ones of the flip-flops, the flip-flops being triggered by the ECPG shift (CLK b) pulse at terminal 31 and then ultimately reset by a RESET (CLK a) signal at terminal 32 from counter 14. The outputs of the various flip-flops are coupled through inverting elements 33a–33h to XOR gates 34a–34h. The other inputs of the XOR's are coupled to ones of the output lines of parity shift register 6 of FIG. 1 such that for each byte of information produced by the flip-flops being inverted by the appropriate inverters, there also arises an individual bit for a parity byte $p_n$. The XOR gates thus comprise a matrix for combining vectors $EB^{-i}$ and $p_n$, and are represented at 7 of FIG. 1. The resulting combined signal is applied to output flip-flops 35a–35h, which have inverter elements appended to the outputs thereof, in response to gating signals at terminals 36 and 37 so that the generated error signal $e_n$ can be loaded into the flip-flops at a desired time. The illustrated bank of flip-flops constitutes storage register 8.

It will be noted that the signals outputted by inverting elements 33a–33h are also applied to an 8-input AND gate 38. Gate 38 produces an output signal (digital 1) when the ECPG (uninverted) output is equal to zero, corresponding to a null state and indicative of a correctly-received data group. Similarly, the data outputs of XOR gates 34a–34h are applied to a second AND gate 39 along with a signal arising upon input terminal 40 which is indicative of the existence of pointers for two information tracks. In this event, the production of a digital 1 by AND gate 39 signals that the parity shift register output is equal to the ECPG output, and that two errors are present. The latter factor must be known since it is possible for errors in different tracks of a common byte to produce a byte which is erroneous, but has proper parity.

It will now be understood that the foregoing figures illustrate means for implementing the production of an error vector $e_n$ by sequentially operating upon received data bytes $D_1$–$D_n$ and an ECC character to derive an error term E, operating upon the vector E in a prescribed manner, then combining the resultant error vector with a parity expression $P_n$ to achieve the numerator of the fraction expressed at (10). To derive the denominator of the expression for the general case it will be necessary to know the separation of two perceived tracks, designated as $(i-j)$.

Viewing now FIG. 6, the details of track separation logic 12 is shown. Pointers for the eight information tracks are applied to the input terminals indicated and as shown to AND gates 41a–41p. Adjacent ones of the AND gates are paired into OR gates 42a–42h, the outputs thereof being fed into a 7-position shift register 43. In addition timing signals representing the ECPG reset, and the existence of two pointers along with a command to load the ECPG, are applied to the shift register. Further, the ECPG shift pulse is applied to the register for cyclicly shifting through the register the signals outputted by OR gates 42a–42h in correspondence with the received track pointers. In addition a "backwards command" is applied through inverter 44 to disable alternate ones of the AND gates 41a–p so as to invert the track sequence to correspond with the sequence which arises when a tape is reversed, as explained hereinabove.

As the contents of shift register 43 are cycled, bits indicating track pointers are sequentially moved through the register in an order according with exponential power of the term associated with the track of interest, as set forth in expression (1) such that the first indication of the track pointer in the lowermost shift register position will be that associated with the most significant track (MST)$i$.

When an indication of the MST in error appears in the lowermost position of register 43 a "most significant track found" STOP signal is produced, as shown. The quantity $(i-j)$ is coded into binary form by associated OR gates 44a–44c and inverters 45a–45c. In addition, a binary expression denominating the existence of a pointer in the parity track may be generated by the application to all three OR gates of the P track pointer signal.

Figure 12:
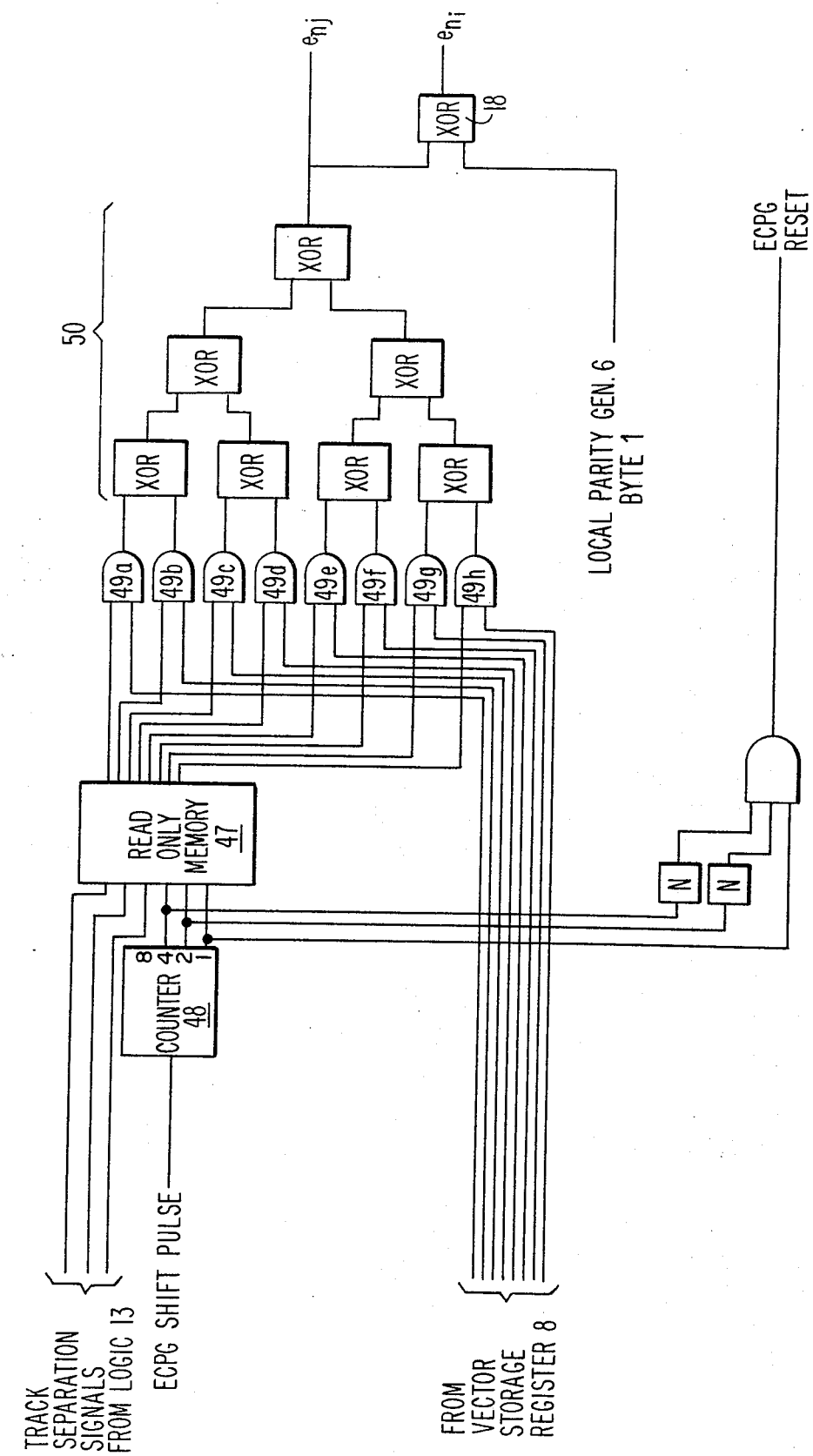

The binary expression indicating track separation is passed through track separation gates 90a–90c (FIG. 13), the timing thereof being established by load and machine reset signals applied through the gates as shown. FIG. 12 shows the application of the $(i-j)$ quantity to a read only memory 47, containing 64 addresses of eight cells each. The error correction code shift pulse also is applied to a binary counter 48 which cycles read only memory 47 in synchronism with the system. The read only memory has been programmed to produce the expression forming the denominator of the fraction above at (10) to be combined with the contents of register 8 in AND gates 49a–49h in a manner well known in the art. The 8-bit output of AND gates 49a–49h is then applied to the "tree" of XOR gates generally designated at 50, the gates being combined in a manner familiar to those skilled in the art to produce a digital 1 output in response to the production of an odd number of digital 1's by AND gates 49a–49h. The output of the XOR gates 50 then comprises error correction vector $e_{nj}$ and contains the necessary bits for correcting the least significant track (LST) of the received data. In addition, the signal is combined in XOR gate 18 with the bits of byte 1 of parity shift register 6 to produce error vector $e_{ni}$ for correcting the most significant track (MST)$i$.

FIG. 7 shows the logic within least significant track correction matrix 17. A binary signal indicating the LST is transmitted from track separation and LST logic 13 to one input each of AND gates 52a–52c. The other inputs of the AND gates are also supplied with another signal indicating the presence of pointers indicating two erroneous tracks, that correction is required for the least significant track, and the absence of a pointer for the locally generated parity track P. The three AND gates, in conjunction with inverters 54a–c serve as a 3 to 8 decoder for energizing the proper one of AND gates 56a–h to correspond with the least significant track in error.

Correction for the most significant track in error is accomplished by MST correction matrix 19, illustrated in detail at FIG. 8. A binary signal produced by counter 9 and indicating the identity of the most significant track $i$ is applied to ones of the inputs of AND gates 58a–c, the other inputs of the AND gates being energized in response to the presence of signals indicating the non-completion of eight shifts of the ECPG, that correction of the MST is required, and a gating signal. The three AND gates are combined with inverters 60a–c in a manner well known in the art to provide a 3 to 8 decoder for energizing the appropriate one off the AND gates 62a–h for indicating the most significant track to be corrected.

Figure 9:
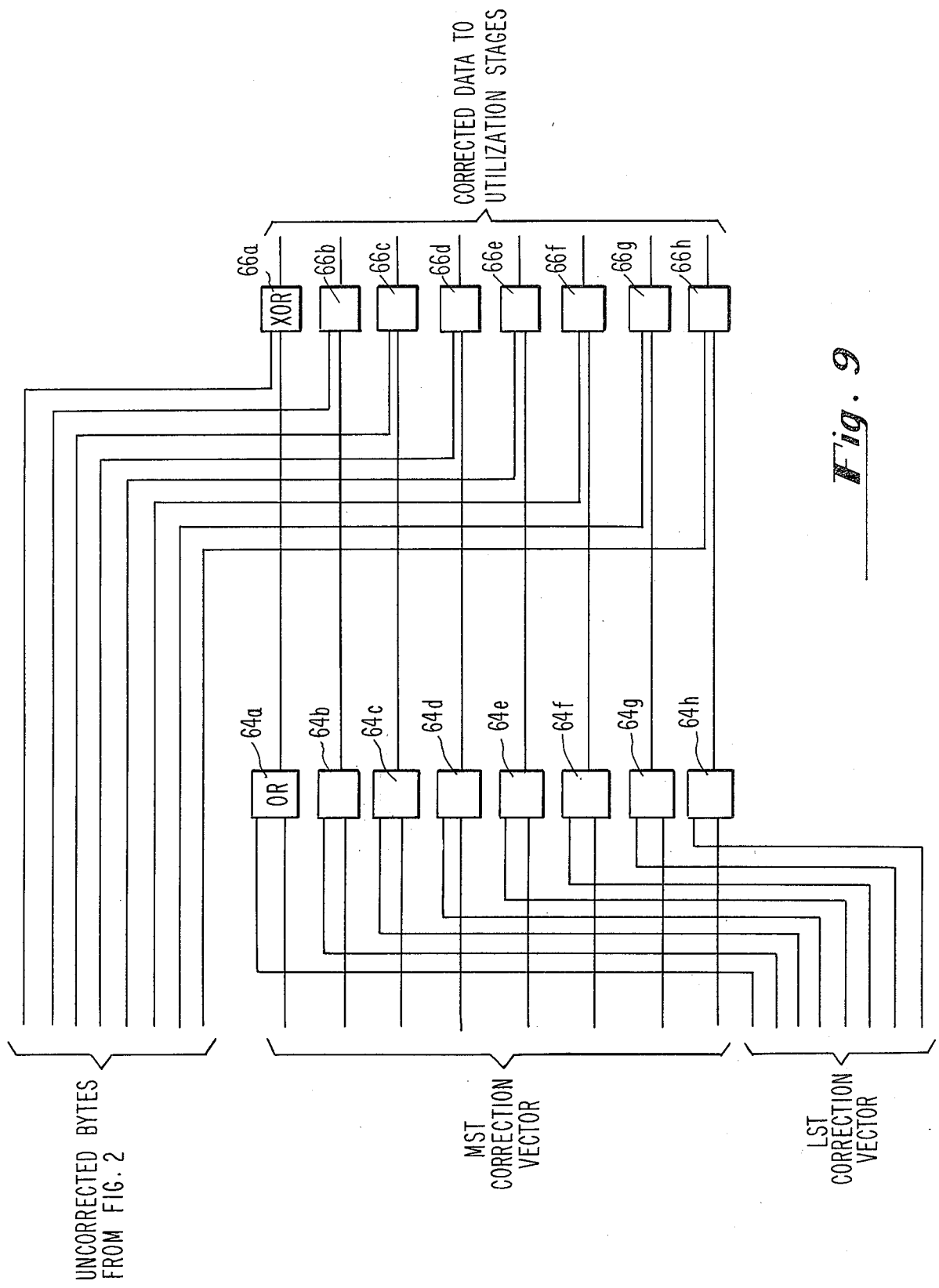

The 8-track outputs from FIGS. 7 and 8 are then applied to data correction matrix 11, the details of which are set forth in FIG. 9. Inputs from corresponding ones of the eight tracks of FIGS. 7 and 8 are applied to the inputs of OR gates 64a–h, the outputs of which are then passed to XOR gates 66a–h along with corresponding track outputs from the received data storage register 2 shown in FIG. 1. In this manner uncorrected data characters are passes, one byte at a time, into XOR's 66a–h. By applying the proper track correction signal through OR gates 64a–h the XOR gates 66a–h operate in a manner familiar to those skilled in he art to invert the polarity of predetermined ones of the pulses received from the register 2. For instance, in order to change the polarity of a bit appearing upon track 1 of a byte received from data storage register 2 it is only necessary to apply a digital 1 to the lower input of XOR 66a. In this case, the output of a digital 1 from track 1 or register 2 will cause XOR gate 66a to produce a digital 0. Conversely, the application of a digital 0 will result in the output of a digital 1. Thus, to correct a track for any given byte the proper ones of OR gates 64a–h are caused to produce a digital 1, effecting the inversion of the bit applied to the corresponding XOR gates 66a–h by the received data storage register. In this manner individual bits of any given byte of data can easily be corrected.

Figure 10:
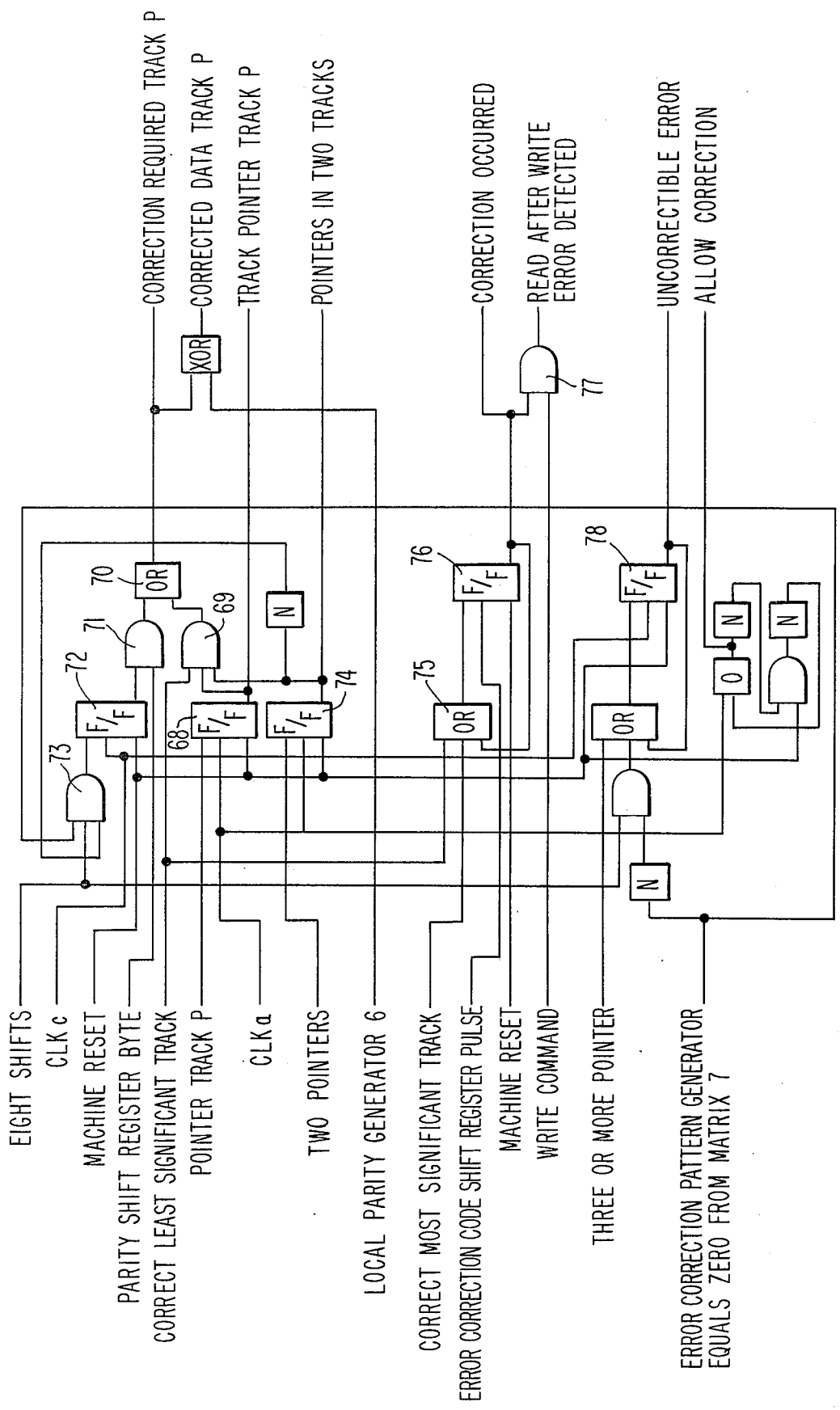

Turning now to the parity track correction logic 20 and which is shown in detail in FIG. 10, the coincidence of a pulse from CLK a and a pointer indicating an error in track P triggers flip-flop 68 to produce a track P pointer signal. This signal, along with one commanding the correction of the LST and the output of flip-flop 74, triggers AND gate 69 to output a track P correction signal from OR gate 70. OR gate 70 may also be triggered in response to the presence of a parity shift register byte signal at AND gate 71 along with a digital 1 from flip-flop 72. Flip-flop 72 is actuated after eight ECPG shifts have occurred, two track pointers are not present, and the ECPG state is still a zero. This combination is effected by AND gate 73. The coincidence of two pointer values at flip-flop 74 along with a load ECPG signal from CLK a triggers flip-flop 74 to apply a two track pointer signal to LST correction matrix 6 and ECPG 3. A signal calling for the correction of either the LST or MST produced by divisor logic 16 and XOR gate 18 causes OR gate 75 to rise, setting flip-flop 76 which is clocked through by an ECC shift register pulse to produce a "correction occurred" output signal. The latter, in combination with a write command signal generated in other parts of the tape transport mechanism is combined in AND gate 77 to produce a "read after write" error detected signal to effect the double checking of the accuracy of a written data byte.

An uncorrectable error is signified by the rising of flip-flop 78. Flip-flop 78 is clocked by CLK $c$ from CLK $c$ counter 14 and is set in response to pointers indicating errors in three or more tracks; or, the coincidence of both eight ECPG shifts and the absence of an ECPG pattern of zero.

It will therefore be seen that the present system is able to correct as many as two data tracks in error, regardless of the number of individual bytes in error. With three or more tracks in error the system does not have sufficient information available to it for causing corrections, although it will indicate that the errors are present. An ALLOW CORRECTION signal is produced to enable MST correction vector matrix 19 in the presence of a correct LST signal from XOR gate 18.

Figure 11:
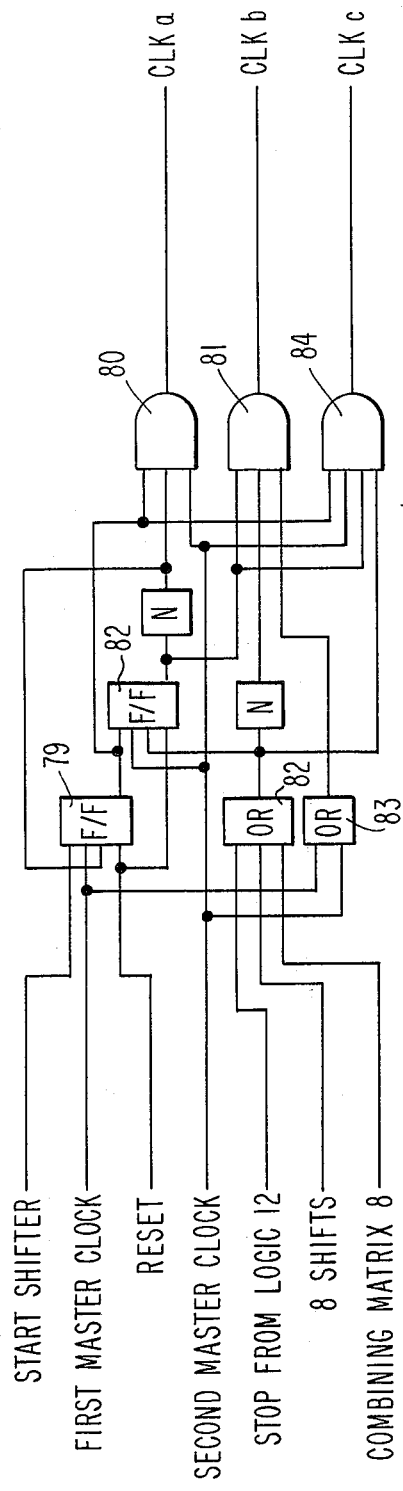

FIG. 11 discloses the logical elements present in one execution of counter 14. External signals derived from the tape transport mechanism with which the present system is associated sets, clocks and resets flip-flop 79. When AND gate 80 is properly gated by the addition of clock signals to the additional inputs thereof a signal is produced which has been herein denominated as CLK $a$. Similarly, CLK $b$ is outputted by AND gate 81 in response to the setting of flip-flop 82, the non-occurrence of an MST signal, the cyclic shifting of the ECPG and the non-coincidence of the locally generated parity $p_n$ with the error vector $e_n$. The final condition requisite for the rising of the output of AND gate 81 is the receipt of a pulse from either the first or the second outside master clocks. Finally, AND gate 84 produces a pulse which comprises the signal CLK $c$ after a start shifter signal is received, the second system clock produces a pulse, flip-flops 82 and 79 are up and one of the inputs to OR gate 82 is present.

Figure 13:
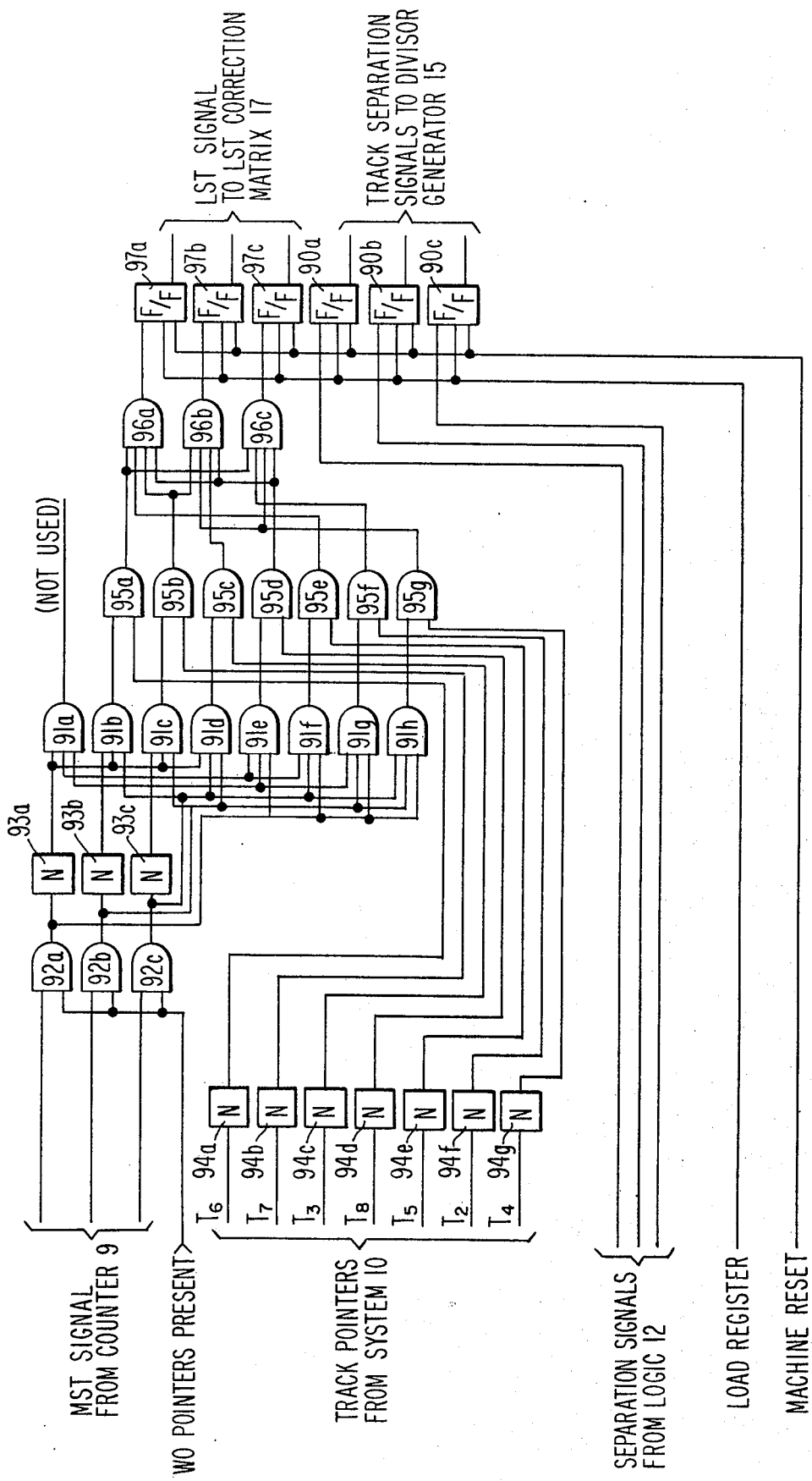

FIG. 13 shows the connection of conventional logic elements in a manner appropriate for carrying out the functions of LST and separation identification logic 13 of FIG. 1. As set forth hereinabove, flip-flops 90a–90c are set by a LOAD REGISTER signal from counter 14 to pass binary-coded track separation signals to the divisor generator 15.

The occurrence of a most significant track (MST) signal at a time when two pointers are present operates appropriate ones of AND gates 92a–c and inverters 93a–c. The latter combination of AND gates and inverters comprises a 3-to-8 converter and enables predetermined ones of the three-input AND gates 91a–h in a pattern which corresponds to the MST. Obviously, if only one track is found to be in error, two pointers will not be present so that none of the AND gates 91a–h will be operated. The case for a single track in error is treated above, and does not involve the use of the track separation and LST logic.

All track pointers produced by the pointer system 10, and associated with appropriate ones of tracks 1–8, are applied by way of inverters 94a–94g to AND gates 95a–95g as shown. The remaining inputs of the latter AND gates are coupled to gates 91b–h such that signals will result upon the coincidence at ones of AND gates 95a–g of both a "1" output from the corresponding gate 91b–h and a digital "1", indicative of the lack of a pointer, from inverters 94a–g. The encoded MST signal and coinciding, inverted pointer signals then trigger AND gates 96a–96c tp produce a binary coded three-track signal which represents the identity of the least significant track (LST). The LST signal is then gated through flip-flops 97a–97c by the LOAD REGISTER signal and in this manner transmitted to the LST correction matrix 17.

It will now be appreciated that there has been described herein a new and useful system for the detection and correction of error in one or two tracks of a data character group arranged in a particular format and including an error checking character bearing a predetermined relationship to the data characters. The system readily identifies and corrects errors arising in a single data track by means described herein and in accordance with the mathematical relationships indicated. In addition, the presence of errors in two tracks of data can also be detected, although the identities of the tracks, necessary for the proper correction thereof, must be determined through the use of pointers.

As will be evident from the foregoing description, certain aspects of the invention are not limited to particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. Apparatus for identifying and correcting errors in one or two tracks of digital information derived from a multi-track medium, bits of data from ones of the tracks forming a byte, said tracks including a parity track, said bytes including $n$ data bytes $D_1$–$D_n$ and an error checking code ECC byte of $i$ bits, said error checking code ECC being related to said data bytes according to the relation $$ECC = \begin{bmatrix} n = 7 \\ m = 1 \\ \Sigma \quad D_n X^m \\ n = 1 \\ m = 7 \end{bmatrix} [X^0 + X^3 + X^4 + X^5 + X^6]$$

comprising:
logic means for operating sequentially upon each of $n$ received data bytes and an ECC byte to produce an error term E, said error term being equal to zero in the absence of errors in the received data and ECC bytes;
second logic means for regressively operating upon said error term $-i$ times to produce the vector $EB^{-i}$;
means for accepting signals representative of data bits of the digital information and responsive thereto for deriving a parity character $P_n$ which in combination with a data byte $D_n$ produces an even number of data bits of a first kind;
combining means for logically combining a regressed error vector and a parity vector $P_n$ on a bit-by-bit basis to form the expression $EB^{-i} + P_n$;
a data correction matrix;
parity correction logic means coupled to said logic means and to said means for accepting for receiving an error vector and a parity vector and operative to apply a signal to said data correction matrix to correct the $i$th data track to conform with said parity vector when said regressed error vector equals said parity vector;
means for receiving track pointers indicating the presence of errors in ones of said tracks and for disabling the correction apparatus when three or more tracks are in error;
track separation logic means coupled to said means for receiving and responsive to track pointers for identifying the separation $(i-j)$ between a most significant track $i$ which is associated with a lower-order polynomial term and a least significant track $j$ which is associated with a higher-order polynomial term of the polynomial $$\begin{array}{l} m = 1 \\ n = 7 \\ \Sigma \; D_n \, X^m; \\ m = 7 \\ n = 1 \end{array}$$

a divisor generator coupled to said track separation logic for selecting the term $1 + B^{-(i-j)}$ in accordance with track separation $(i-j)$;

dividend logic means for dividing said regressively operated vector by the output of said divisor generator to produce an error vector $e_{nj}$ for data in the least significant track $j$ in error;

logic means for combining on a bit-by-bit basis said derived parity character $P_n$ and said error vector $e_{nj}$ to produce an error vector $e_{ni}$ for data in the most significant track $i$ in error;

means for associating said error vectors $e_{ni}$ and $e_{nj}$ with the data tracks $i$ and $j$ respectively; and said data correction matrix receiving uncorrected data and said error vectors and combining said data and said vectors to invert the polarity of erroneous bits of said uncorrected data in accordance with the characteristics of said error vectors.

2. The invention defined in claim 1, further including:
means for receiving a pointer indicative of an error in a received parity track P; and
means for correcting said parity track to correspond to said error vector $e_{ni}$.

3. Apparatus for identifying and correcting errors in one or two tracks of digital information derived from an encoded medium, said tracks including a parity track, each track being encoded with bits, each bit being associated with another bit from each track to form a byte, said bytes comprising data bytes $D_1$–$D_n$ and an error checking byte ECC, said error checking byte being related to said data bytes according to the relation $$ECC = \begin{bmatrix} m = 1 \\ n = 7 \\ \Sigma \; D_n \, X^m \\ n = 1 \\ m = 7 \end{bmatrix} [X^0 + X^3 + X^4 + X^5 + X^8]$$

comprising:
first logic means for operating sequentially upon each of $n$ received data bytes and the error checking byte according to an operator B to produce an error term E, said operator B being such as to produce the error checking byte by sequentially operating upon data bytes $D_1$–$D_n$, said error term being equal to zero in the absence of errors in the received data and error checking bytes;

second logic means for regressively operating $i$ times upon said error term according to the operator B to sequentially produce error vectors $e_{n1}$ through $e_{ni}$;

means responsive to bits encoded on the parity track of the digital information for generating parity vectors $P_n$ which when combined with a received byte and associated parity term produce an even number of data bits of a first kind;

means for sequentially combining ones of said error vectors with ones of said parity vectors;

separation logic means for receiving track pointers indicating the existence of errors in two identifiable tracks and producing output signals in response thereto;

track separation logic means coupled to said separation logic means and responsive to said output signals for identifying the separation between the most significant and least significant tracks in error;

divisor generator means coupled to said track separation logic means for outputting a divisor expression;

means for dividing ones of the combined error vector $e_{ni}$ and parity vector by said divisor expression to produce an error vector for data in the least significant track in error;

means for additively combining said least significant track error vector and said parity vector to produce an error vector for data in the most significant track in error; and a matrix for associating each of said error vectors with appropriate ones of said tracks in error and for correcting erroneous data bits in said tracks in accordance with said error vectors.

4. Apparatus as set forth in claim 3, further including sequence inversion means coupled to said first logic means for inverting the order in which tracks of data bits are received by said first logic means.

5. Apparatus as defined in claim 4, further including means for rendering said identifying and correcting apparatus inoperative when track pointers indicating errors in three or more tracks are present.

6. Apparatus as defined in claim 5, further including means for receiving a pointer indicative of an error in a received parity track; and
means for correcting said parity track in conformity with the error vector for said most significant track in error.

7. Apparatus as defined in claim 6, wherein said matrix for associating includes a first plurality of inputs, further including:
means for sequentially applying bytes of uncorrected received data to said first plurality of inputs;
said matrix for associating comprising a data correction matrix including said first plurality of inputs and further having a second plurality of inputs, one input for each data track;

a most significant track correction vector matrix having a plurality of outputs coupled to said second plurality of inputs, and having inputs coupled to said means for additively combining and to said means for identifying said most significant track in error, for combining an error vector signal and a track identification signal and outputting a correction signal upon one of said outputs coincidentally with the transfer of a byte having an erroneous data bit in the most significant track in error to said data correction matrix; and a least significant track correction vector matrix having a plurality of outputs coupled to said second plurality of inputs, and having inputs coupled to said means for dividing and to said separation logic, for combining an error vector signal and a track identification signal and outputting a correction signal upon one of said outputs coincidentally with the transfer of a byte having an erroneous data bit in the least significant track in error to said data correction matrix.

8. The method of identifying and correcting errors in one or two tracks of digital information derived from an encoded medium, said tracks including a parity track, each track being encoded with bits, each bit being associated with another bit from each track to form a byte, said bytes including $n$ data bytes and an error checking code byte, comprising:
  operating $n + 1$ times upon $n$ sequentially received data bytes and an error checking code byte in accordance with the operator B, said operator B being that operator used to develop the ECC byte in the encoded data, to produce an error term E;
  generating a local parity signal to provide an even number of data bits of a first kind for each received data and error checking code byte including a received parity bit;
  regressively operating upon error term E with the operator B a number of times $i$ to sequentially produce error vectors $e_{n1} - e_{ni}$;
  combining each sequentially produced error vector with ones of said parity vectors;
  detecting a coincidence between an error vector and a parity vector; and
  correcting the track of received data whose position corresponds to the number of regressive operations needed to achieve correspondence between said error and parity vectors, in accordance with the error vector so achieved.

9. The method defined in claim 8, further including the steps of
  detecting the occurrence of $n + 1$ regressive operations in which no coincidence between an error vector and a parity vector has occurred;
  detecting the presence of two tracks of received data in whih errors may have occurred and identifying the tracks;
  dividing the combined error vector $e_{ni}$ for the most significant track in error and the associated parity vector by a term which is a function of the separation of the two tracks in error to produce an error vector $e_{nj}$ for the least significant of said tracks;
  associating the least significant track error vector $e_{nj}$ with the least significant track in error;
  associating the most significant track error vector $e_{ni}$ with the most significant track in error; and
  correcting the erroneous tracks in accordance with said error vectors.

10. The method defined in claim 9, wherein $i$ represents the position of the most significant track in error and $j$ represents the position of the least significant track in error wherein the term by which combined error and parity vectors are divided is $$1 + B^{-i-j}.$$

11. The method defined in claim 10, further including the step of detecting the presence of three or more tracks in error and preventing the correction of any of said tracks.

12. The method defined in claim 11, wherein said error vectors each comprise at least $n$ bits, which bits are sequentially compared with corresponding bits in a given track of received data.

* * * * *